May 31, 1927.
J. C. BIRELY
1,630,921
WINDSHIELD CLEANER
Filed March 12, 1926
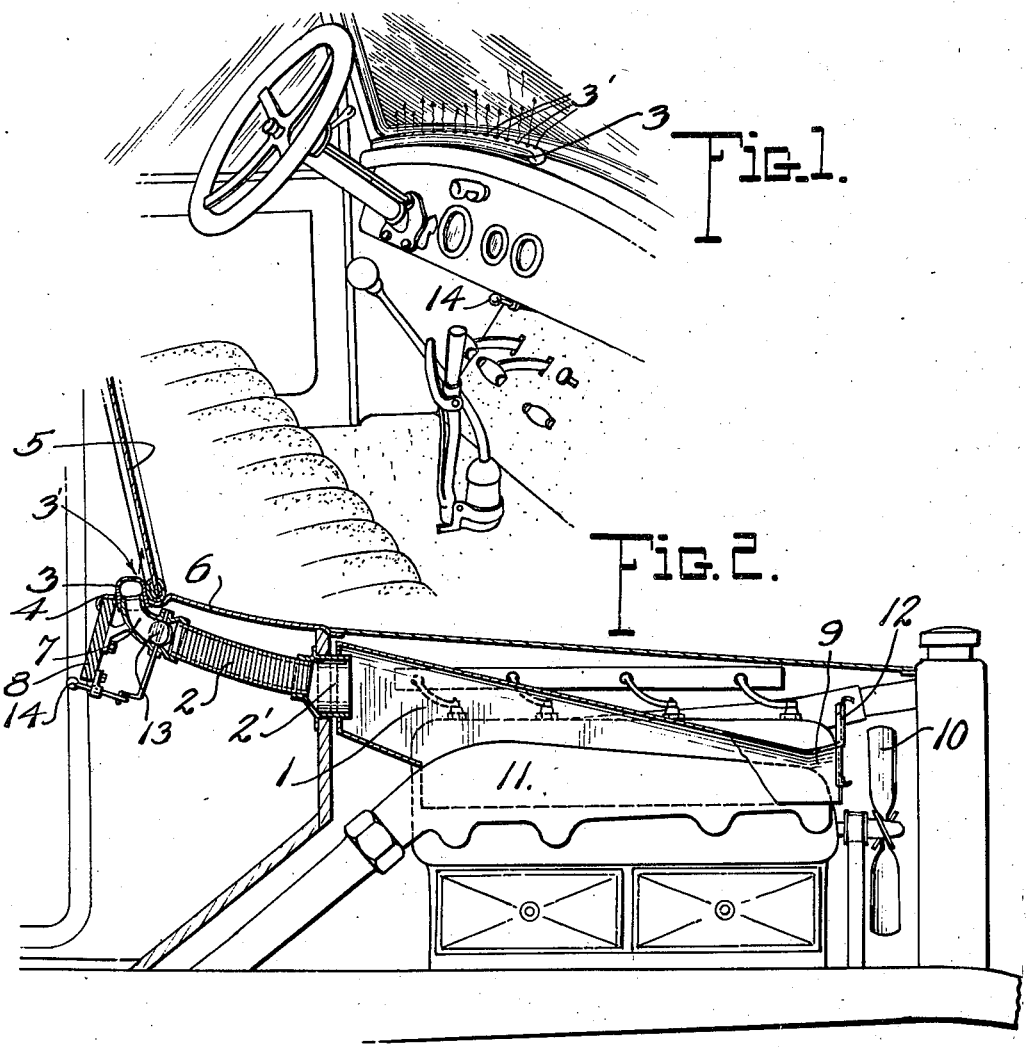
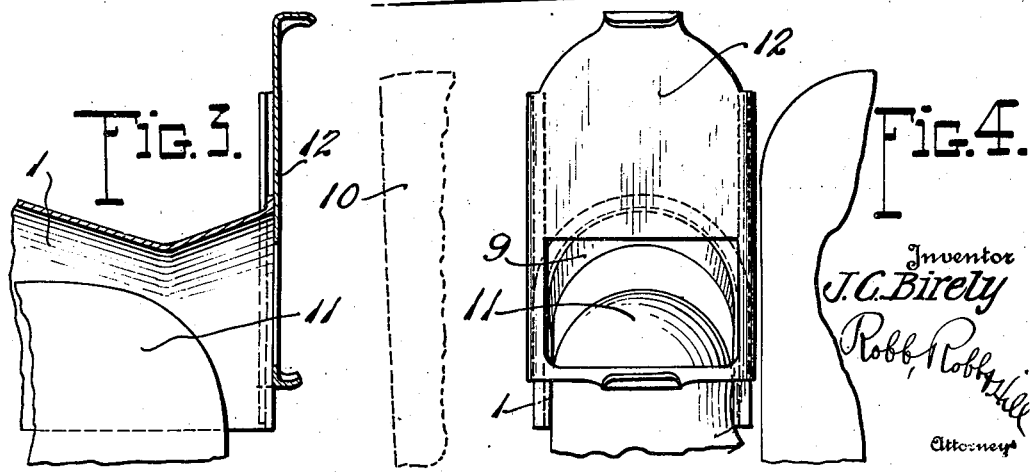

Patented May 31, 1927.

1,630,921

UNITED STATES PATENT OFFICE.

JESSE C. BIRELY, OF NEW OXFORD, PENNSYLVANIA, ASSIGNOR OF ONE-HALF TO A. R. BRODBECK, OF HANOVER, PENNSYLVANIA.

WINDSHIELD CLEANER.

Application filed March 12, 1926. Serial No. 94,307.

The present invention appertains to improvements in windshield cleaners of that type which is designed to employ the medium of heat to prevent the accumulation of snow, frost, or moisture on the windshield and to maintain clear vision therethrough.

It is well recognized at this time that the cleaners for automobile windshields of the squeegee type, perhaps the most approved and effective of known devices, become partially or wholly ineffective to prevent the resultant impairment of vision through the shield incident to the rapid accumulation of moisture thereon and glazing over of its surface in the more frigid weather. Moreover, the fact that the efficiency of the cleaner depends primarily upon a more or less flexible strip of rubber which in a short time deteriorates from exposure to the elements and cannot function to produce sufficient pressure, makes them far from satisfactory. Further, these devices are generally operative over the exterior of the shield and therefore have a tendency to scratch the surface owing to the presence of grit, in addition to which they have no effectiveness in removing moisture on the interior surface due to condensation.

These difficulties have led me to devise a means for applying heat from a suitable source to the windshield so that not only will the moisture on the interior be removed or prevented from accumulating, but the exterior surface also will be maintained free or clear.

The present invention, therefore, has for its primary object the provision of means for conducting waste heat produced by the engine to a point where it may be directed against the surface of the shield to perform its function in a simple manner and without radical modification of the construction of the vehicle or the engine structure. It is to be understood, however, that the device depicted is but one exemplification of the principle utilized by me, and is subject to modification falling within the spirit of the invention and the scope of the claim hereto appended.

In the drawing:—

Figure 1 is a perspective view of the interior of the forward portion of an automobile, showing more clearly the arrangement of the distributing nozzle used in conjunction with the invention;

Figure 2 is a longitudinal sectional view showing the details of the invention;

Figure 3 is an enlarged sectional view of the intake end of the heating chamber, showing the shutter control; and Figure 4 is a front elevation thereof.

Like reference characters designate corresponding parts throughout the several figures of the drawing.

In carrying out the invention, I provide a housing or heating chamber 1 which is suitably constructed for, and arranged in such relation to, the exhaust line of the engine that the heat therefrom is collected in a relatively large quantity. As here illustrated, I have applied this compartment to the exhaust manifold because of its ready application to the same and the advantage of the intensity of the heat at this point. To one end of this housing is connected a flexible metallic tube or conduit 2, a coupling 2' of any desired construction being employed intermediate the housing 1 and said tube. The opposite end of the tubing is connected to a horizontally disposed nozzle or conduit 3 which is disposed upon the ledge 4 just in advance of the wind-shield 5 on the interior of the same. This conduit or nozzle 3 may extend the full width of the shield but this is not necessary and I prefer to utilize a length of tubing which will take care of at least one-half of the windshield in front of the driver, so as to maintain this section of the shield clear.

Under the conditions, the connection to the tubing 2 which extends upwardly beneath the cowl 6 is made at a point centrally of the ledge 4, a neck-piece 7 being preferably employed to establish the connection between the tube and the nozzle pipe 3. This neck connection 7 lies directly in rear of the instrument board 8 and it will be apparent that the device is thus entirely out of sight with the exception of the nozzle conduit 3. If desired, this conduit may be arranged below the ledge 4, especially where provision is made for the incorporation of this apparatus at the time of the manufacture of the vehicle body.

The forward end of the housing 1 is provided preferably with a flared entrance 9 which is arranged just in rear of the fan 10 of the automobile, the latter tending to direct a stream of air into the housing. The air passes over the exhaust manifold 11, and owing to the extent of the heated surface to which the air is subjected said air is intensely heated and passes upwardly through the tube to the nozzle pipe 3.

Owing to the inclination of the shield and to the tendency of the heat to rise, as well as to the force with which this air is passed through the apparatus, a very large area of the glass is effectively heated, the air passing out of the pipe or nozzle 3 through a plurality of openings 3' which are provided throughout the length of the pipe and in such a position as to direct the heated air upwardly against and over the inner surface of the shield.

In order to control or regulate the degree of heat or the amount of the heated air which is passed into the nozzle I employ a shutter 12 mounted over the flared intake port 9 of the housing 1. This shutter may be manually adjusted by raising the hood, or means (not shown) may be provided for raising and lowering the same from the interior of the machine, as desired.

In order that the operation of the apparatus may be discontinued at will, I provide a throttle or shutter valve 13 in the neck 7 which may be actuated by means of the rod 14 mounted on the instrument board 8 at a convenient position for access by the driver.

It will be understood that this device performs a dual function: primarily that of heating the windshield glass so as to prevent the accumulation of moisture thereon either with reference to the exterior or the interior of the same; and, secondarily, that of heating of the interior of the automobile. A still further function is subserved and that is the provision of ventilation for the interior of closed cars, and in view of the simplicity of the structure a very effective apparatus is provided which does not require a modification of the automobile to enable its installation.

I desire it to be understood that the heat for the purpose explained may be taken from the exhaust line at other than the point of the exhaust manifold where this may be desired or necessary in carrying out the installation of this apparatus, in which event the form or construction of the casing 1 would be necessarily modified to some degree. The arrangement depicted in the drawings, however, I have found to be extremely efficient as it enables the taking advantage of the circulation produced by the automobile fan as well as the movement of the machine to move the air through the heating device.

Having thus described my invention, what I claim as new and desire to secure by Letters Patent is:

In a windshield cleaner and heater for automobiles provided with an inwardly and upwardly sloping windshield with respect to the passenger space, a distributing nozzle connected to the source of heat on one end and terminating at the other on the inside of the windshield and at the bottom thereof to provide an impingement of the heated air outside the area of vision and a distribution of the same over the entire depth of the windshield.

In testimony whereof I affix my signature.

JESSE C. BIRELY.